United States Patent
Angelo et al.

(10) Patent No.: US 7,143,278 B2
(45) Date of Patent: Nov. 28, 2006

(54) METHOD AND APPARATUS FOR OFFLOADED ENHANCED BOOT PROCESS

(75) Inventors: Michael F. Angelo, Houston, TX (US); Thomas J. Bonola, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 513 days.

(21) Appl. No.: 10/369,362

(22) Filed: Feb. 18, 2003

(65) Prior Publication Data

US 2004/0162974 A1  Aug. 19, 2004

(51) Int. Cl.
*G06F 9/00* (2006.01)
*G06F 15/177* (2006.01)

(52) U.S. Cl. ............. 713/2; 709/217; 709/219
(58) Field of Classification Search ......... 713/1, 713/2
See application file for complete search history.

(56) References Cited

U.S. PATENT DOCUMENTS

| | | | |
|---|---|---|---|
| 5,349,643 A * | 9/1994 | Cox et al. ............ 713/155 |
| 5,546,585 A * | 8/1996 | Soga ................... 713/2 |
| 6,263,431 B1 * | 7/2001 | Lovelace et al. ...... 713/2 |
| 6,725,382 B1 * | 4/2004 | Thompson et al. ..... 726/19 |
| 6,735,696 B1 * | 5/2004 | Hannah ............... 713/189 |
| 6,973,587 B1 * | 12/2005 | Maity et al. ......... 714/6 |
| 6,996,547 B1 * | 2/2006 | Tugenberg et al. .... 705/77 |
| 2003/0084307 A1 * | 5/2003 | Schwartz ............. 713/189 |
| 2003/0200428 A1 * | 10/2003 | Chan et al. .......... 713/1 |
| 2003/0208696 A1 * | 11/2003 | Piwonka et al. ...... 713/202 |
| 2004/0088533 A1 * | 5/2004 | Chuang ............... 713/1 |

* cited by examiner

*Primary Examiner*—Lynne H. Browne
*Assistant Examiner*—James F. Sugent

(57) ABSTRACT

A secure boot environment may be provided that includes a secure memory isolated but accessible to a coupled processing device. The secure memory may store and provide boot strap instruction to the processing device. In addition, an authentication system may be provided to ensure secure access to the secure memory.

16 Claims, 3 Drawing Sheets

METHOD AND APPARATUS FOR OFFLOADED ENHANCED BOOT PROCESS

BACKGROUND

Server computers are utilized extensively today to provide for, among other uses, centralized or distributed storage repositories for applications software and for other software. Often, a server computer is utilized in a network environment to provide these applications and other software to other computers that may be interconnected through the network. This type of arrangement is particularly efficient for downloading common applications that may be utilized by a variety of different computers from one conveniently serviced server computer.

Today, it is not uncommon for a large number of server computers to be physically mounted within a single computer rack or otherwise in close proximity. It may be convenient from a serviceability standpoint and other standpoints to be able to provide for the booting of the servers in a secure manner. Additionally, it may also be highly desirable to eliminate redundant drives such as disk drives that may be utilized in the boot up process to load an operating system onto the server computer. This may be particularly true for "server blades" which are typically stand-alone server computers that have been integrated into a single plug-in card. As such, server blades may not have associated with them a boot device such as a disk drive.

The present invention may address one or more of the above issues.

BRIEF DESCRIPTION OF THE DRAWINGS

The invention may be best understood by referring to the following description and accompanying drawings that are used to illustrate embodiments of the invention.

DETAILED DESCRIPTION

Figure 1:
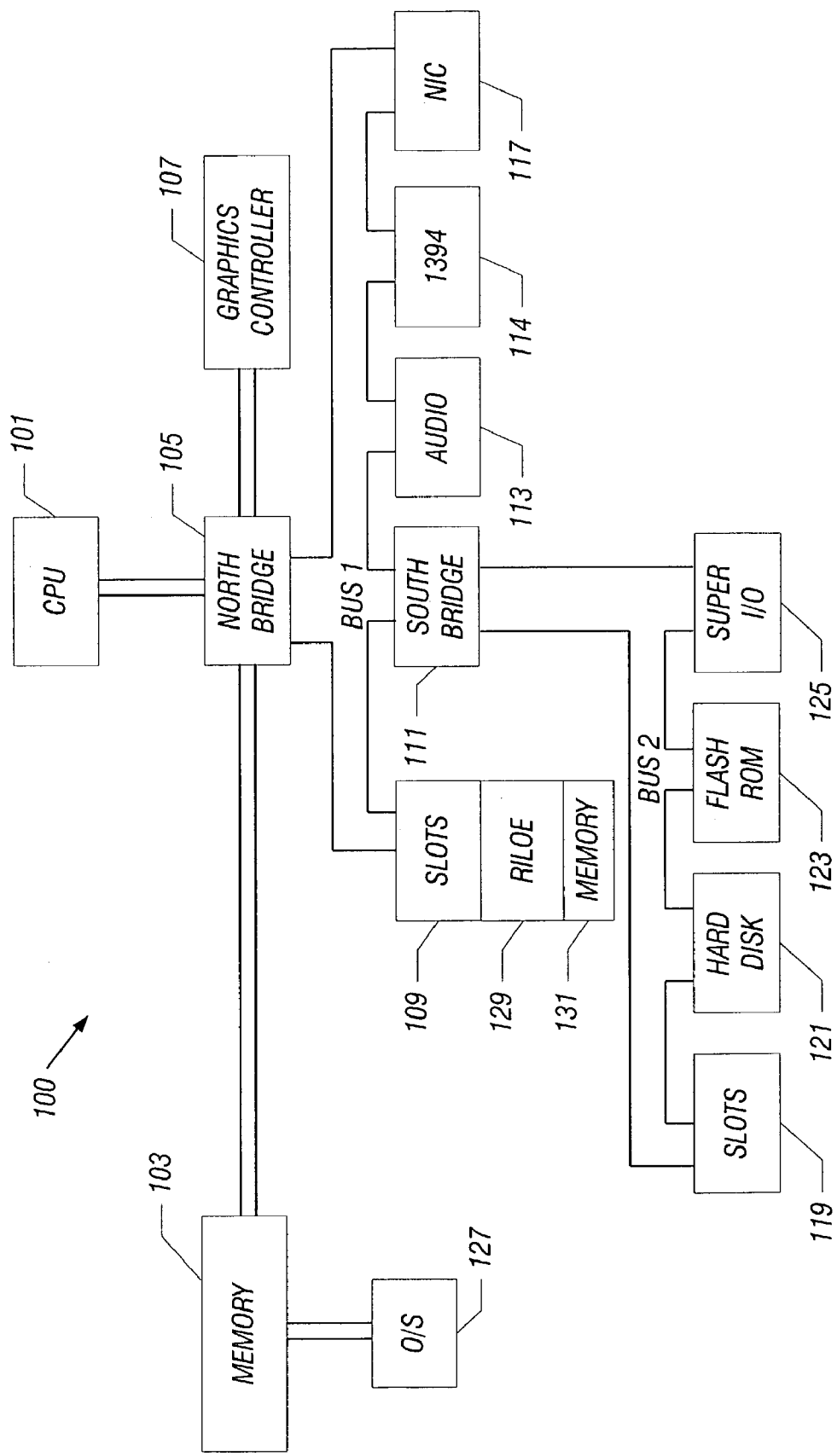
FIG. 1 illustrates a server computer in accordance with embodiments of the present invention.

In the following description, numerous specific details are set forth to provide a detailed understanding of the present invention. However, one skilled in the art will readily appreciate that the present invention may be practiced without these specific details.

A computer, including a server computer, includes both physical hardware and instructions that may cause the physical machine to perform functions, namely the software. Software may be generally considered to be application software or system software. A program that controls the hardware of the computer and the execution of the application programs is generally called system software. This system software may typically include the operating system, which may be the program which controls the actual computer or central processing unit (CPU) and associated device drivers, which may control the input/output devices (I/O), such as printers, keyboards, disk drives, and other such input/output devices A computer, including a server computer, includes both physical hardware and instructions that may cause the physical machine to perform functions, namely the software. Software may be generally considered to be application software or system software. A program that controls the hardware of the computer and the execution of the application programs is generally called system software. This system software may typically include the operating system, which may be the program which controls the actual computer or central processing unit (CPU) and associated device drivers, which may control the input/output devices (I/O), such as printers, keyboards, disk drives, and other such input/output devices A typical operating system is too large to be stored in the limited amount of read only memory that may be available in typical computer systems. Therefore, most computer systems utilize a small program to start the computer, which may then be utilized to load additional software, so that the computer may boot an operating system. This small software may be considered a BIOS (which is typically referred to as the basic input/output system). In many computers, the BIOS is stored in a ROM and begins executing on power up or reset of the associated computer. The BIOS may, among other functions, begin reading one or more sectors from a storage device such as a floppy disk or other storage device. The data on the storage device may be subsequently utilized to load into the computer memory an operating system that may be stored on a disk drive or other storage device.

Server computers may typically be connected to one or more networks, such as a local area network (LAN), wide area network (WAN), or other network. These networks facilitate the transfer of data between computers that may be connected to one or more of the networks. One advantage of a network architecture is that software on the server may be shared between many computers as needed. From a service standpoint, serviceability may be enhanced as only one copy of a particular piece of software may need to be maintained instead of, for example, having a copy of a particular piece of software on multiple computers, each of which may need to be maintained.

Additionally, for security reasons, it may be advantageous to have a single secure copy of the instructions needed to boot an operating system that may be utilized by one or more servers. In this manner, security of the servers utilizing the secure BIOS may be enhanced Referring now to FIG. 1, a computer system 100 may include a central processing unit 101 or other processing device, one or more memory devices 103, and a bridge device such as north bridge 105. The north bridge 105 may be coupled to a graphics controller 107 that may, in some embodiments, be connected to the north bridge 105 through an advanced graphics port (AGP) bus.

Additionally, north bridge 105 may be coupled through bus 1 to plug-in slots 109 that may be utilized, in some embodiments, to expand the computer resources. Additionally, north bridge 105 may be coupled through bus 1 to a second bridge device such as south bridge 111. North bridge 105 may also be coupled through bus 1 to various peripheral devices such as an audio section 113, an IEEE 1394 interface device 114, and a network interface card (NIC) 117. Persons skilled in the art will understand that other variations are also possible.

South bridge 111 may be coupled through bus 2 to devices such as expansion slots 119. In addition, south bridge 111 may be coupled to storage devices such as a hard disk 121 and a read only memory (ROM) device such as, in some embodiments, a flash ROM. Additionally, in some embodiments, the south bridge 111 may also be coupled to a super I/O controller 125.

Bus 1 and bus 2 may be implemented in any suitable bus architecture, for example, a peripheral connect interface bus (PCI) or other interface bus. Memory 103 may contain code such as operating system 127, which may be utilized by CPU 101 or other CPU to control one or more functions of the computer system 100. Additionally, a remote inside lights out edition (RILOE) remote manager may be coupled to bus 1 through slots 109 or other slots. The RILOE may be available from Hewlett-Packard Corporation located in Palo Alto, Cali. The RILOE may advantageously be physically located within the same common housing as the CPU 101. Of course, other computer bus, memory and 110 arrangements may also be possible as will be understood by those skilled in the art.

Figure 2:
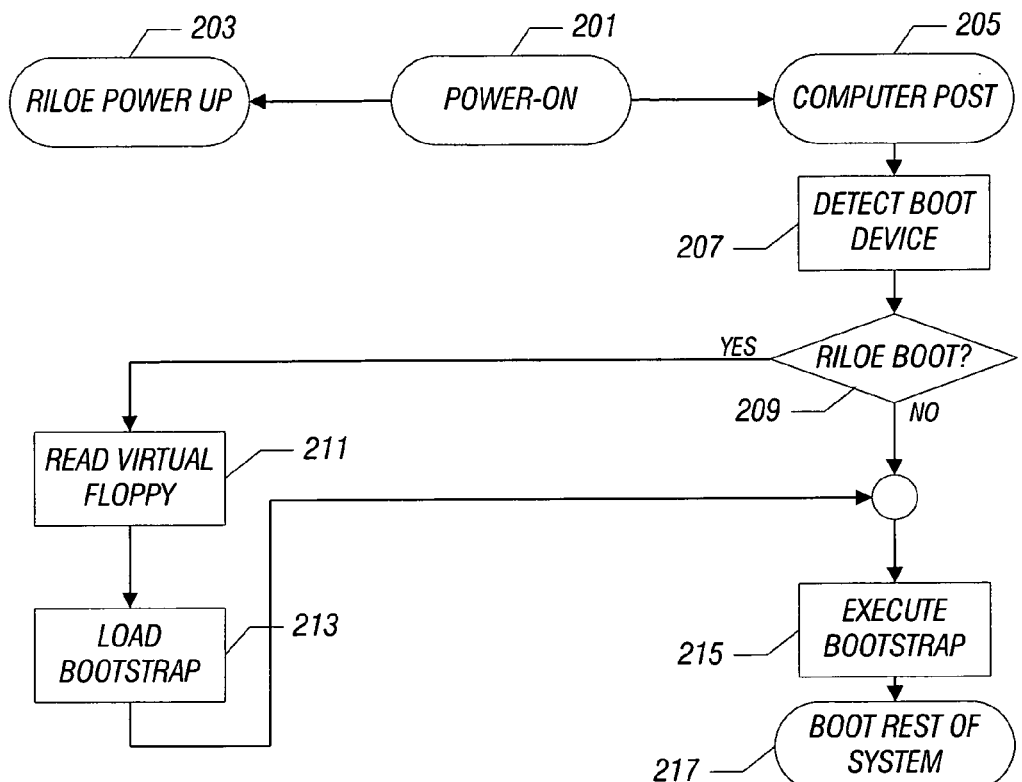
FIG. 2 illustrates a boot process in accordance with embodiments of the present invention.

Referring now to FIG. 2, the flow chart depicted may be followed, in some embodiments, by a computer utilizing an RILOE management board. Upon power on 201, the RILOE board will power up 203 and the computer 100 will also begin its power on self-test (POST) process 205. The computer 100 may then detect a boot device 207 which may be, for example, a floppy disk, a hard disk, a network boot, or a boot from an RILOE management board. If an RILOE management board is detected and the computer 100 is configured to boot from the RILOE board 209, then the computer 100 may then read a boot block from a secure memory 211 that may be part of the RILOE management board. The computer 100 may then load a bootstrap 213 set of instructions that may be part of the boot block residing in the RILOE memory 131. The computer 100 may then execute the boot strap instructions 215 which may then be operative to cause the CPU 101 and associated hardware to load the rest of the system 217, such as an operating system, from a storage device such as hard disk 121 or other storage device.

The boot strap instructions which may be loaded at 213 may be previously stored in the RILOE memory area 131 at some prior point in time. For example, the RILOE memory 131 may be loaded by another computer, not shown, through a network port. In other embodiments, the boot strap instructions loaded at 213 may be pre-loaded into memory 131 during the configuration of computer 100 or at some other time.

Figure 3:
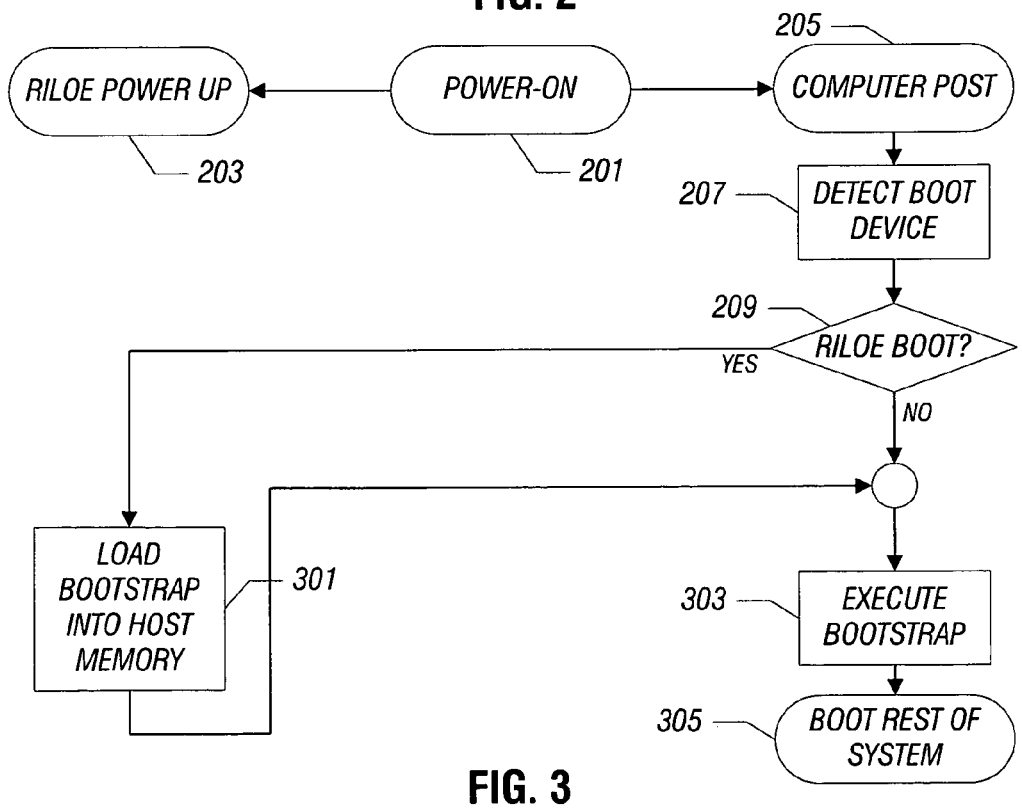
FIG. 3 illustrates a boot process in accordance with embodiments of the present invention wherein a boot strap is loaded into a host memory.

Referring now to FIG. 3, the boot sequence illustrated in FIG. 3 may be similar to that as discussed and illustrated in FIG. 2 for like-numbered blocks. However, instead of the computer 100 performing the functions in blocks 211 and 213, the RILOE board 129 may operate to load a boot strap instructions directly into host memory such as memory 103. Thereafter, computer 100 may then execute the boot strap instructions 303 which were previously loaded into memory 103 and boot the rest of the system 305, such as an operating system that may reside on hard disk 121 or other storage device.

Figure 4:
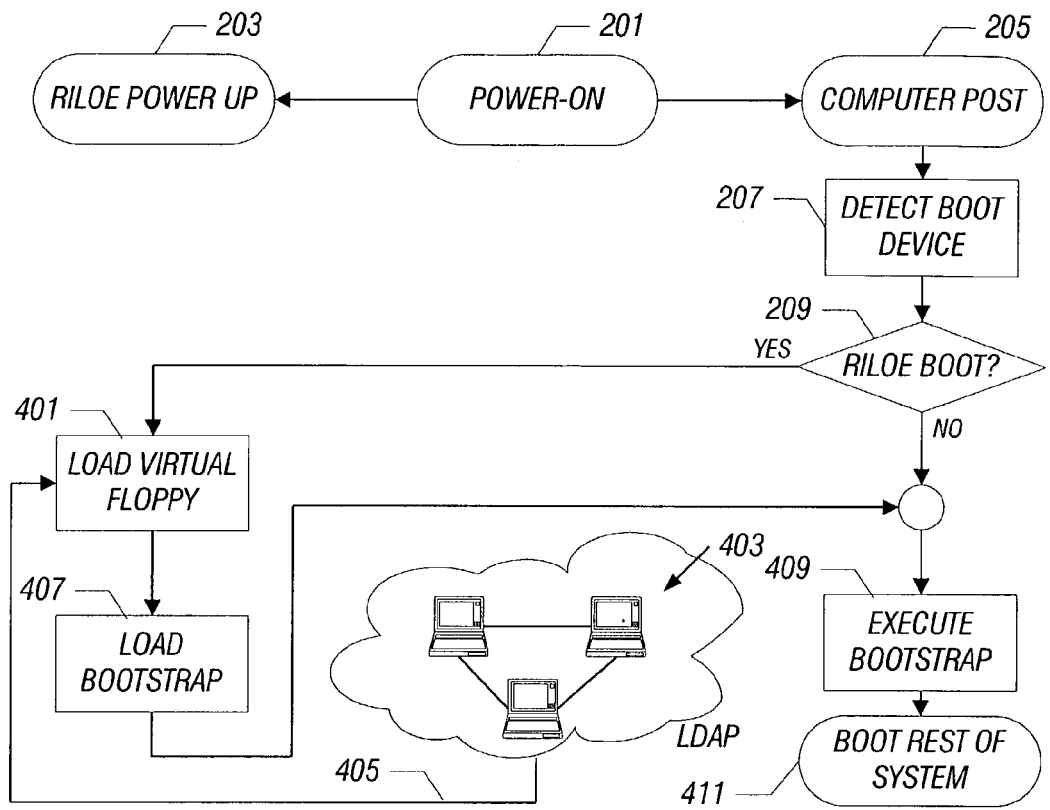
FIG. 4 illustrates a boot process in accordance with embodiments of the present invention wherein a virtual drive may store data from an external computer or computers.

Referring now to FIG. 4, the boot process may be similar to that described previously for a previously described numbered block. However, in some embodiments, at block 401 computer 100 may utilize a virtual floppy drive that may be part of the RILOE board 129. The RILOE board 129 may utilize, in part, a secure memory to store the virtual floppy data. The secure memory may be secure as it may be private to the RILOE board and not addressable by CPU 101 or other devices in computer 100. Data in the virtual floppy drive may be loaded by one or more computers 403 coupled to the RILOE board through a connection 405 that may be, for example, a network connection. Once the data is loaded into the virtual floppy, then computer 100 may then load boot strap instructions 407 and then execute the boot strap instructions 409. The boot strap instructions 409 may cause the CPU 101 to load an operating system or other system 411.

In the various embodiments of the invention, the boot strap instructions executed by the CPU 101, or other CPU, may be loaded into a memory area addressable by the CPU 101 or other devices of computer 100 by the RILOE board by using a direct memory access (DMA) or other memory transfer process. Thereafter, the CPU 101 may load and execute the boot strap instructions as detailed above. The RILOE board may require one or more security processes to be performed before the RILOE board will transfer data from the RILOE secure memory to other memory areas within the computer 100.

Figure 5:
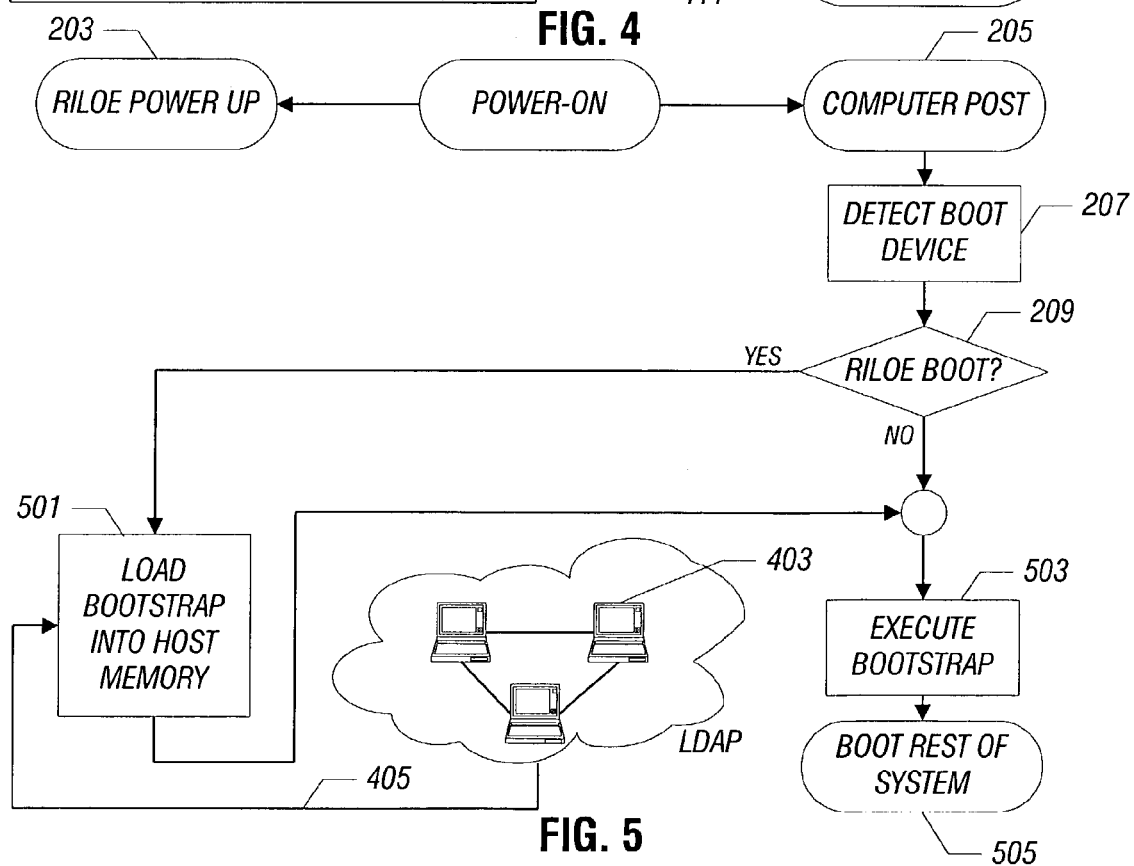
FIG. 5 illustrates a boot process in accordance with embodiments of the present invention wherein one or more external computers may supply bootstrap instructions that may then be loaded into host memory.

Referring now to FIG. 5, at block 209, the RILOE management board 129 may also, in some embodiments, load bootstrap instructions into host memory 501 from one or more computers 403 through a communications network 405. After the RILOE board loads the boot strap into host memory, such as memory 103, the computer 100 may execute boot strap instructions 503 that may be operative to boot the rest of the system 505, such as an operating system or other system from a storage device such as hard disk 121.

The above embodiments may utilize a RILOE management board 129, or other management board to provide a secure boot environment. The RILOE 129 may authenticate any request to access the secure memory located on the RILOE board or coupled to the RILOE board. This authentication may take the form of password validation, signed commands or other secure processes. A signed command may be one of secure signatures i.e. Secure hash encrypted with a private key, that is validated by recalculating the hash and decrypting the signature and comparing the two hash values; or may be a representative value that is protected via a shared secret key for authentication purposes. The CPU 101 may, in some embodiments, also validate the boot instruction that may be stored by the RILOE. By utilizing these devices and techniques, a secure boot environment may be provided.

Additionally, in some embodiments, the RILOE may provide boot instructions to a requesting CPU or other processor or process based, in part, on information received with the data request. This information may include identification or other information that the RILOE may utilize to select, from a plurality of boot instructions, the particular instructions provided to the requester. In the case of identification information, the information may relate to the type of processor or process requesting the boot instructions or other data.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method of booting a computer comprising:
   detecting a first device having a secure memory containing, in part, boot strap instructions and wherein the first device is coupled to a bus of the computer and wherein the secure memory is not addressable by other devices coupled to the bus;

loading at least one boot strap instruction into the secure memory from a network directly coupled to the first device;

reading, by one of the other devices coupled to the bus, the at least one instruction provided from the secure memory; and booting the computer using, in part, the at least one instruction.

2. The method as in claim 1 further comprising the first device implementing a virtual floppy disk containing, in part, the at least one boot strap instruction loaded from the network.

3. The method as in claim 1 further comprising transferring at least one instruction from the secure memory to another memory coupled to the computer and booting the computer using, in part, the transferred at least one instruction.

4. The method as in claim 1 wherein reading the at least one instruction includes sending the first device validation data before reading the at least one instruction.

5. The method as in claim 4 further comprising the first device authenticating the validation data before allowing access to data stored in the secure memory.

6. The method as in claim 5 further comprising the first device receiving a password.

7. The method as in claim 5 further comprising the first device receiving a signed command.

8. A system comprising:
a first device including a secure memory coupled to a processing device wherein the secure memory is not addressable by the processing device;
the secure memory having at least one boot strap instruction stored therein;
the processing device reading at least one boot strap instruction provided from the secure memory; and the processing device utilizing, in part, the at least one boot strap instruction to boot an operating system,
wherein the at least one boot strap instruction is loaded into the secure memory from a network directly coupled to the first device.

9. The system as in claim 8 wherein the first device implements a virtual floppy disk containing, in part, the at least one boot strap instruction loaded from the network.

10. The system as in claim 8 wherein at least one instruction is transferred from the secure memory to another memory coupled to the processing device and the processing device is booted using, in part, the transferred at least one instruction.

11. The system as in claim 8 wherein reading the at least one instruction includes sending the first device validation data before reading the at least once instruction.

12. The system as in claim 11 wherein the first device authenticates the validation data before allowing access to data stored in the secure memory.

13. The system as in claim 12 wherein the first device receives a password.

14. The system as in claim 12 further comprising the first device receiving a signed command.

15. A processing system comprising:
a first processing device;
means, coupled to the first processing device, for providing a secure memory containing bootstrap instructions, wherein the secure memory is not addressable by the first processing device;
means for retrieving the bootstrap instructions from a remote data base and storing the instructions in the secure memory;
means to transfer the bootstrap instructions from the secure memory to another memory device coupled to the first processing device; and
means for reading the transferred boot strap instructions and booting the first processing device utilizing, in part, the transferred bootstrap instructions.

16. The system as in claim 15 further comprising means for transferring one of a plurality of boot strap instructions from the secure memory to another memory device based, in part, on identification information received from the requestor.

* * * * *

UNITED STATES PATENT AND TRADEMARK OFFICE
CERTIFICATE OF CORRECTION

PATENT NO. : 7,143,278 B2 Page 1 of 1
APPLICATION NO. : 10/369362
DATED : November 28, 2006
INVENTOR(S) : Michael F. Angelo et al.

It is certified that error appears in the above-identified patent and that said Letters Patent is hereby corrected as shown below:

In column 2, lines 6-18, delete "A computer, including a server computer, includes both physical hardware and instructions that may cause the physical machine to perform functions, namely the software. Software may be generally considered to be application software or system software. A program that controls the hardware of the computer and the execution of the application programs is generally called system software. This system software may typically include the operating system, which may be the program which controls the actual computer or central processing unit (CPU) and associated device drivers, which may control the input/output devices (I/O), such as printers, keyboards, disk drives, and other such input/output devices".

In column 6, line 12, in Claim 11, delete "once" and insert -- one --, therefor.

Signed and Sealed this

Twenty-first Day of April, 2009

JOHN DOLL
*Acting Director of the United States Patent and Trademark Office*